United States Patent Office 3,647,818
Patented Mar. 7, 1972

---

3,647,818
1-(POLYHALOALKYLTHIO) INDAZOLES
Joseph G. E. Fenyes, 8073 Hansom Drive,
Oakland, Calif. 94605
No Drawing. Filed Sept. 15, 1966, Ser. No. 579,512
Int. Cl. C07d 49/18
U.S. Cl. 260—310 C                    6 Claims

ABSTRACT OF THE DISCLOSURE

Indazoles of the formula:

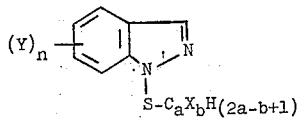

wherein $a$ is 1 or 2, $b$ is 3 when $a$ is 1 and is from 3 to 5 when $a$ is 2, X is halogen of atomic number from 17 to 35 with at least one X being bonded to the carbon atom which is bonded to the sulfur atom, Y is halogen of atomic number from 17 to 35 or nitro in positions 4 to 6 of the indazole nucleus and $n$ is an integer from 0 to 1. These compounds are fungicidal and bactericidal.

---

This invention is directed to 1-(polyhaloalkylthio) indazoles and their use as pesticides.

The unique indazoles of this invention are 1-polyhaloalkylthio indazoles in which the polyhaloalkylthio group contains 1 to 2 carbon atoms and has 3 to 5 halogens of atomic number of 17 to 35, i.e., chlorine or bromine, at least one of said halogens being bonded to the carbon atom which is bonded to the sulfur and the indazole nucleus has 0 to 1 nitro or halogen substituents in positions 4 to 6 of the indazole nucleus. These compounds may be represented by the general formula

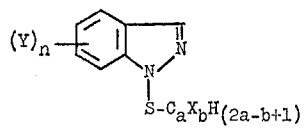

wherein $a$ is 1 or 2, $b$ is 3 when $a$ is 1 and is from 3 to 5 when $a$ is 2, X is halogen of atomic number from 17 to 35 with at least one X being bonded to the carbon atom which is bonded to the sulfur atom, Y is halogen of atomic number from 17 to 35 or nitro in positions 4 to 6 of the indazole nucleus and $n$ is an integer from 0 to 1. Preferably, X is chlorine, $a$ is 2 and $b$ is 4.

Examples of compounds having the above formula are 1-trichloromethylthio) indazole,
1-(tribromomethylthio) indazole,
1-(trichloromethylthio)-4-nitroindazole,
1-(trichloromethylthio)-5-chloroindazole,
1-(1',2'-dibromo-1',2'-dichloroethylthio) indazole,
1-(perchloroethylthio) indazole,
1-(1',2',2'-trichloroethylthio) indazole,
1-(1',1',2',2'-tetrachloroethylthio) indazole,
1-(1',1',2'-tribromoethylthio) indazole,
1-(1',1',2',2'-tetrachloroethylthio)-5-nitroindazole,
1-(1',1',2',2'-tetrachloroethylthio)-6-bromoindazole, and
1-(1',1',2',2'-tetrachloroethylthio)-4-chloroindazole.

These novel indazoles may be made by reacting an appropriate polyhaloalkylsulfenyl halide with indazole or a suitably substituted indazole. If desired, the alkali metal salt of indazole may be used. The reaction may be carried out in an aqueous medium or in an organic solvent such as ether, hexane or benzene. If an organic solvent is used, a hydrogen halide acceptor, such as a tertiary amine, must be present. The 1-(polyhaloalkylthio) indazole may be separated from the reaction mixture by conventional methods such as recrystallization. They are solids which are soluble in organic solvents such as acetone, benzene, ether and the like.

The following examples illustrate specific methods by which the compounds of this invention may be prepared. These examples are offered as illustrative only and are not meant to limit the invention as described herein. Unless otherwise indicated, percentages are by weight.

EXAMPLE 1

8.1 g. of 5-nitroindazole, 10.0 ml. of 1,1,2,2-tetrachloroethylsulfenyl chloride and 100 ml. chloroform were added to 50 ml. water in a flask. 5 ml. of acetone were added to this mixture and it was stirred at room temperature for about 18–19 hours. The aqueous layer was then separated from the organic layer and discarded. The organic layer was washed consecutively with dilute aqueous hydrochloric acid and water and then dried over anhydrous magnesium sulfate. The solution was then filtered and stripped under reduced pressure. The solid residue was washed with hexane and then dried to give 16.5 g. of 1 - (1',1',2',2' - tetrachloroethylthio) - 5 - nitroindazole. This compound melted at 121–123° C. and had the following analysis: Found—Cl, 40.1%, S, 8.55%; calculated—Cl, 39.28%; S, 8.88%.

EXAMPLE 2

Using the general method described in Example 1, 1-(1', 1',2',2'-tetrachloroethylthio - 6 - nitroindazole was prepared using 6-nitroindazole instead of 5-nitroindazole. This compound melted at 125–127° C. and had the following analysis: Mound—Cl, 38.75%; S, 8.73%; calculated—Cl, 39.28%; S, 8.88%.

EXAMPLE 3

By the general method described in Example 1, 1-(1', 1',2',2'-tetrachloroethylthio) - 5 - chloroindazole was prepared using 5-chloroindazole instead of 5-nitroindazole. It melted at 97–98.5° C. and had the following analysis: Found—Cl, 50.70%; S, 9.88%; calculated—Cl, 50.88%; S, 9.15%.

EXAMPLE 4

5.0 g. of 5-chloroindazole were suspended in 100 ml. chloroform in a flask. 50 ml. of water and 7 ml. trichloromethylsulfenyl chloride were added to this suspension. The total mixture was stirred at ambient temperature for 6½ hours and then allowed to stand overnight. The chloroform layer was separated from the aqueous layer. The chloroform layer was washed twice with dilute HCl, twice with water and then dried over anhydrous magnesium sulfate. After drying the layer was filtered and the chloroform was evaporated off under reduced pressure. A solid formed. It was washed with mixed hexanes and then dried to give 5.5 g. 1-(trichloromethylthio) - 5 - chloroindazole. It melted at 103–105° C. and had the following analysis: Found—Cl, 47.15%; S, 10.62%; calculated—Cl, 46.96%; C, 10.60%.

The indazoles of this invention have excelent biological activity, especially against fungi and bacteria. As a group their activity is in general superior to N-polyhaloalkylthio pyrazoles.

Indazoles of this invention were tested as fungicides by means of the mycelial drop test. This test measures the fungitoxicity of a compound in terms of its inhibition of fungus mycelial growth. Each indazole was dissolved in acetone to a 500 p.p.m. concentration. Equal volumes of this solution were applied to the centers of each of three replicate paper discs inoculated with the desired fungus mycelium and placed on potato-dextrose agar medium. Following this application the discs were incubated along with inoculated but untreated control discs at ambient temperatures until the control discs were filled with mycelial growth. The fungicidal activity of the indazole was determined by comparing the radii of mycelial growth away from the edges of the treated and control discs. From this comparison a percent inhibition based on the relative mycelial growth areas was determined. The results of these tests are reported in Table I.

TABLE I

| Compound | Percent inhibition | | | |
|---|---|---|---|---|
| | Pythium ultinum | Helmintho- sporium sativum | Fusarium oxysporum | Rhizoc- tonia solani |
| 1-(1′,1′,2′,2′-tetrachloroethylthio)-6-nitroindazole | 100 | 100 | 100 | 100 |
| 1-(1′,1′,2′,2′-tetrachloroethylthio)-5-chloroindazole | 97 | 100 | 98 | 100 |
| 1-(1′,1′,2′,2′-tetrachloroethylthio)-5-nitroindazole | 100 | 100 | 100 | 100 |
| 1-(trichloromethylthio)-5-chloroindazole | 100 | 100 | 78 | 100 |

Indazoles of this invention were also tested as bactericides. The test method involved contacting a dilute bacterial suspension with the indazole in an aqueous bacterial medium and was carried out as follows: Bacterial medium was made by mixing 21.5 g. dehydrated Emerson's Broth (beef peptone, glysate, sodium chloride, yeast extract and dextrose) in 900 ml. distilled water. The bacterial suspension was made by preparing 21.5 g. dehydrated Emerson's Broth in one l. distilled water, inoculating the broth with the desired bacteria, incubating the culture and diluting the broth culture tenfold with sterilized water. 9.0 ml. of the medium was put in a vial. The vial was capped and autoclaved at 17 p.s.i. for 20 minutes to ensure aseptic conditions. 0.9 ml. of bacterial suspension diluted with water to the same turbidity (measured with a spectrophotometer) as the medium and 50 ml. of an acetone solution of the indazole at the desired concentration were added to the vial.

The vial's contents were then incubated at 23–24° C. for 40–48 hours. Photometric readings of the vial were made after this period to determine the turbidity of the vial. Similar readings were made on an untreated control sample. Percent inhibition of bacterial growth was determined by the following formula Percent inhibition
$$= \frac{\text{percent light blocked on test}}{\text{percent light blocked on control}} \times 100$$

The test results are reported in Table II.

TABLE II

| Compound | Concen- tration, p.p.m. | Percent inhibition | | | |
|---|---|---|---|---|---|
| | | A | C | E | P |
| 1-(1′,1′,2′,2′-tetrachloroethylthio)-6-nitro indazole | 10 | 100 | 100 | 100 | 100 |
| | 3 | 97 | 100 | 100 | 96 |
| | 1 | 83 | 82 | 17 | 76 |
| 1-(1′,1′,2′,2′-tetrachloroethylthio)-5-nitro indazole | 10 | 100 | 100 | 100 | |
| | 3 | 100 | 100 | 100 | 96 |
| | 1 | 83 | 63 | 89 | 85 |

NOTE.—A=*Agrobacteria tumafaciens*; C=*Corynebacteria michiganense*; E=*Erwinia carotovora*; P=*Pseudomonas syringae*.

Aside from the specific methods shown above, these indazoles may be applied by conventional methods in fungitoxic and bactericidally effective amounts to fungal and bacterial pathogens or to environments which host these pathogens. They may be applied with appropriate inert carriers and diluents as powders, solutions or dispersions. Pesticidal formulations of these indazoles may also contain stabilizers, spreading agents, wetting agents, stickers and other compatible pesticides.

As will be evident to those skilled in the art, various modifications on this invention can be made or followed, in the light of the foregoing disclosure and discussion, without departing from the spirit or scope of the disclosure or from the scope of the following claims.

I claim:

1. Indazole of the formula

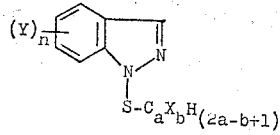

where $a$ is 1 or 2, $b$ is 3, when $a$ is 1 and is from 3 to 5 when $a$ is 2, X is halogen of atomic number from 17 to 35 with at least one X being bonded to the carbon atom which is bonded to the sulfur atom, Y is halogen of atomic number from 17 to 35 in positions 4 to 6 of the indazole nucleus and $n$ is an integer from 0 to 1.

2. The indazole of claim 1 wherein $a$ is 2 and X is chlorine.

3. The indazole of claim 1 wherein $a$ is 1 and X is chlorine.

4. The indazole of claim 1 wherein $a$ is 2, $b$ is 4, X is chlorine, $n$ is 1 and Y is chlorine in position 5.

5. An indazole of the formula

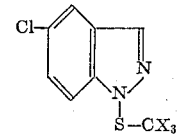

wherein X is halogen of atomic number from 17 to 35.

6. 1-(1′,1′,2′,2′-tetrachloroethylthio)-5-chloro indazole.

References Cited

UNITED STATES PATENTS

| 2,553,770 | 5/1951 | Kittleson | 260—309.5 |
| 2,553,775 | 5/1951 | Hawley et al. | 260—309.5 |
| 2,844,628 | 7/1958 | Kuhle et al. | 167—33 D |
| 2,888,462 | 5/1959 | Cannon | 260—310 C |
| 3,178,447 | 4/1965 | Kohn | 260—309.5 |

NATALIE TROUSOF, Primary Examiner

U.S. Cl. X.R.

424—273